(12) United States Patent
Von Broembsen

(10) Patent No.: US 7,288,503 B2
(45) Date of Patent: Oct. 30, 2007

(54) APPARATUS AND METHOD FOR PRODUCING ACTIVATED CARBON

(76) Inventor: David Von Broembsen, 3405 Noble Creek Dr. NW., Atlanta, GA (US) 30327

( * ) Notice: Subject to any disclaimer, the term of this patent is extended or adjusted under 35 U.S.C. 154(b) by 775 days.

(21) Appl. No.: 10/763,407

(22) Filed: Jan. 22, 2004

(65) Prior Publication Data

US 2004/0213726 A1    Oct. 28, 2004

Related U.S. Application Data

(60) Provisional application No. 60/442,041, filed on Jan. 23, 2003.

(51) Int. Cl.
*C01B 31/08*    (2006.01)

(52) U.S. Cl. ...................... 502/423; 502/421; 502/437; 423/445 R

(58) Field of Classification Search ............ 423/445 R; 502/421, 423, 437
See application file for complete search history.

(56) References Cited

U.S. PATENT DOCUMENTS

| 4,472,245 A | 9/1984 | Halm |
| 5,089,457 A | 2/1992 | Gaylard et al. |
| 5,190,901 A | 3/1993 | Hirai |
| 5,946,342 A | 8/1999 | Koslow |

*Primary Examiner*—Stuart Hendrickson
(74) *Attorney, Agent, or Firm*—Myers & Kaplan, LLC; Barry E. Kaplan, Esq.

(57) ABSTRACT

An apparatus and method for charcoal production and activation, wherein a multipurpose furnace system is utilized to manufacture high grade charcoal from hardwood starting materials, which, in turn, promotes the manufacture of activated charcoal, while providing a viable and significant cost saving alternative to ongoing, intensive worldwide, efforts to increase yield and quality of charcoal product.

4 Claims, 8 Drawing Sheets

FLOW DIAGRAM FOR MANUFACTURE OF CHARCOAL FROM HARDWOODS

PLAN ON LID

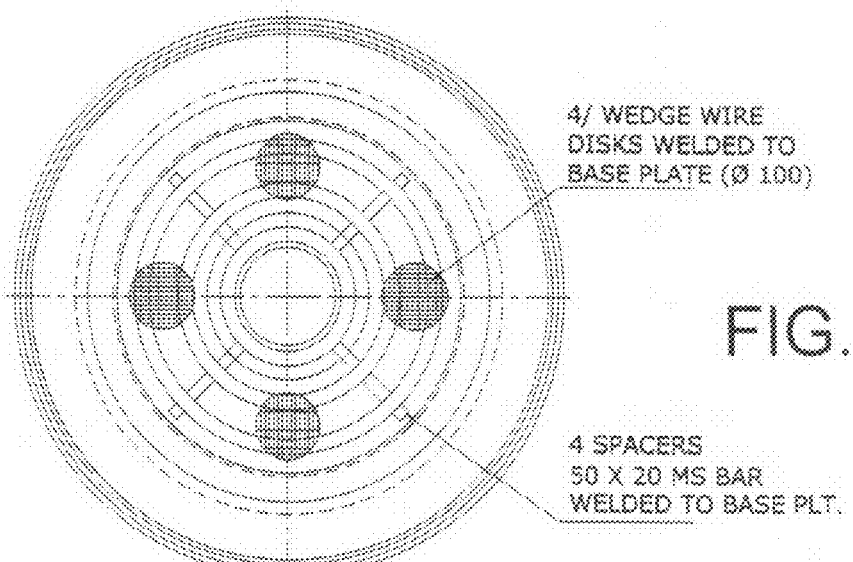
FIG. 5
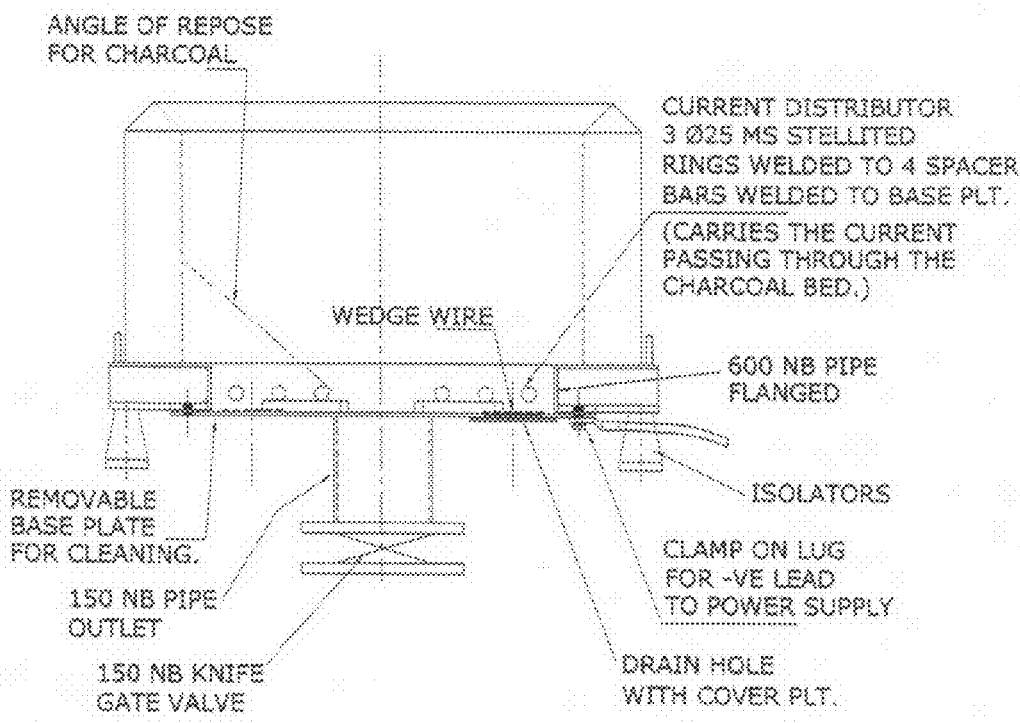

APPARATUS AND METHOD FOR PRODUCING ACTIVATED CARBON

CROSS-REFERENCE AND PRIORITY CLAIM TO RELATED APPLICATIONS

To the fullest extent permitted by law, the present non-provisional patent application claims priority to and the full benefit of provisional patent application entitled "APPARATUS AND METHOD FOR PRODUCING ACTIVATED CARBON", filed on Jan. 23, 2003, having Ser. No. 60/442,041.

TECHNICAL FIELD

The present invention relates generally to charcoal activation processes, and more specifically to an apparatus and method for charcoal activation.

BACKGROUND OF THE INVENTION

Going back over many hundreds of years, the technology for the carbonization of hardwoods for production of crude charcoal has remained unchanged.

Specifically, in the past century, various improvements, in traditional charcoal producing processes, have been introduced, resulting in a charcoal product containing less impurities and volatiles.

Additionally, utilizing Rotary Kilns, Multiple Hearth Furnaces, Fluidized Bed Reactors, Vertical Retorts, Gasifiers, or the like, improved charcoal has been converted into activated charcoal via high temperatures in a non-oxidizing or partially-oxidizing environment.

Unfortunately, many such systems and processes are typically costly, and require much energy. Moreover, many such systems and processes are still unable to yield desired quantities of quality charcoal.

Therefore, it is readily apparent that there is a need for a an apparatus and method for charcoal activation, wherein a multipurpose furnace system is utilized to manufacture high grade charcoal from hardwood starting materials, which, in turn, promotes the manufacture of activated charcoal, while providing a viable and significant cost saving alternative to ongoing, intensive worldwide, efforts to increase yield and quality of charcoal product.

BRIEF SUMMARY OF THE INVENTION

Briefly described, in a preferred embodiment, the present invention overcomes the above-mentioned disadvantages and meets the recognized need for such a device by providing an apparatus and method for charcoal activation, wherein a multipurpose furnace system is utilized to manufacture high grade charcoal from hardwood starting materials, which, in turn, promotes the manufacture of activated charcoal, while providing a viable and significant cost saving alternative to ongoing, intensive worldwide, efforts to increase yield and quality of charcoal product.

According to its major aspects and broadly stated, the present invention in its preferred form is an apparatus and method for charcoal activation having an improved furnace system that electrically and internally generates energy within the charcoal bed.

More specifically, the present invention is an apparatus and method for charcoal activation, wherein the invention proposed herein represents a lateral shift different from the present charcoal activation systems in that the energy is not externally sourced, but rather electrically and internally generated within the charcoal bed. This is accomplished by passing an electrical current through the charcoal bed as a result of imposing a voltage across the extremities of the charcoal bed.

The electrical current flows between electrodes, positioned at the top and bottom of the refractory column of the furnace, in contact with the charcoal. An electrical current passing through the bed in this way results in a uniform temperature rise within the bed due to the resistive heating effect (i.e., volts×current=watts).

The applied voltage can be varied to control the heating effect, and consequently the temperature rise in the bed, in a uniform and predictable way.

Accordingly, a feature and advantage of the invention is its ability to provide improved energy requirements (i.e., as Kcals/lb of activated charcoal) versus conventional systems.

A feature and advantage of the invention is its ability to provided improved yield, based on dried wood chips to activated charcoal versus conventional systems.

A feature and advantage of the invention is its ability to provide a 2% attritional loss per cycle, based on subsequent discharged activated charcoal to storage versus a 25% loss of conventional systems.

A feature and advantage of the invention is that no contamination is introduced into the charcoal bed, as opposed to conventional internally heated rotary kilns, multiple hearth furnaces, gasifiers, vertical retorts and fluidized bed reactors that have a tendency to introduce contamination via inert hot gases.

These and other features and advantages of the present invention will become more apparent to one skilled in the art from the following description and claims when read in light of the accompanying drawings.

BRIEF DESCRIPTION OF THE DRAWINGS

The present invention will be better understood by reading the Detailed Description of the Preferred and Alternate Embodiments with reference to the accompanying drawing figures, in which like reference numerals denote similar structure and refer to like elements throughout, and in which:

FIG. 5 is an illustration of an apparatus for charcoal activation according to a preferred embodiment of the present invention;

DETAILED DESCRIPTION OF THE PREFERRED AND ALTERNATIVE EMBODIMENTS

In describing the preferred and alternate embodiments of the present invention, as illustrated in FIGS. 1-8, specific terminology is employed for the sake of clarity. The invention, however, is not intended to be limited to the specific terminology so selected, and it is to be understood that each specific element includes all technical equivalents that operate in a similar manner to accomplish similar functions.

Referring now to FIGS. 1-8, illustrated therein is the preferred embodiment of the equipment items involved in the manufacture of product from the raw materials.

Preferably, the basic raw material for the process is hardwood chips, which can be obtained from many sources but preferably from waste product of sawmills and furniture factories.

The wood chips are sized into particles approximately less than 10 millimeters in a chipping machine, and then fed by gravity onto a double deck vibrating screen where the particles approximately greater than 7 millimeter are returned to the chipping machine and the particles approximately less than 7 millimeters, but approximately greater than 3 millimeters, are fed to the sized woodchip feed hopper. It should be recognized that other suitably-sized chips could be utilized.

Sized wood chips approximately less than 7 millimeters, but approximately greater than 3 millimeters, and activated charcoal granules, approximately less than 6 millimeters, but approximately greater than 3 millimeters, are then blended on an equal volumetric basis using vibrating feeders which discharge the blend into a transit bag for gravity feed into the preferred activation furnace.

The activation process in the activation furnace is preferably initiated by applying a voltage (i.e., preferably approximately 500 VDC) across the activated charcoal/woodchip bed.

Figure 1:
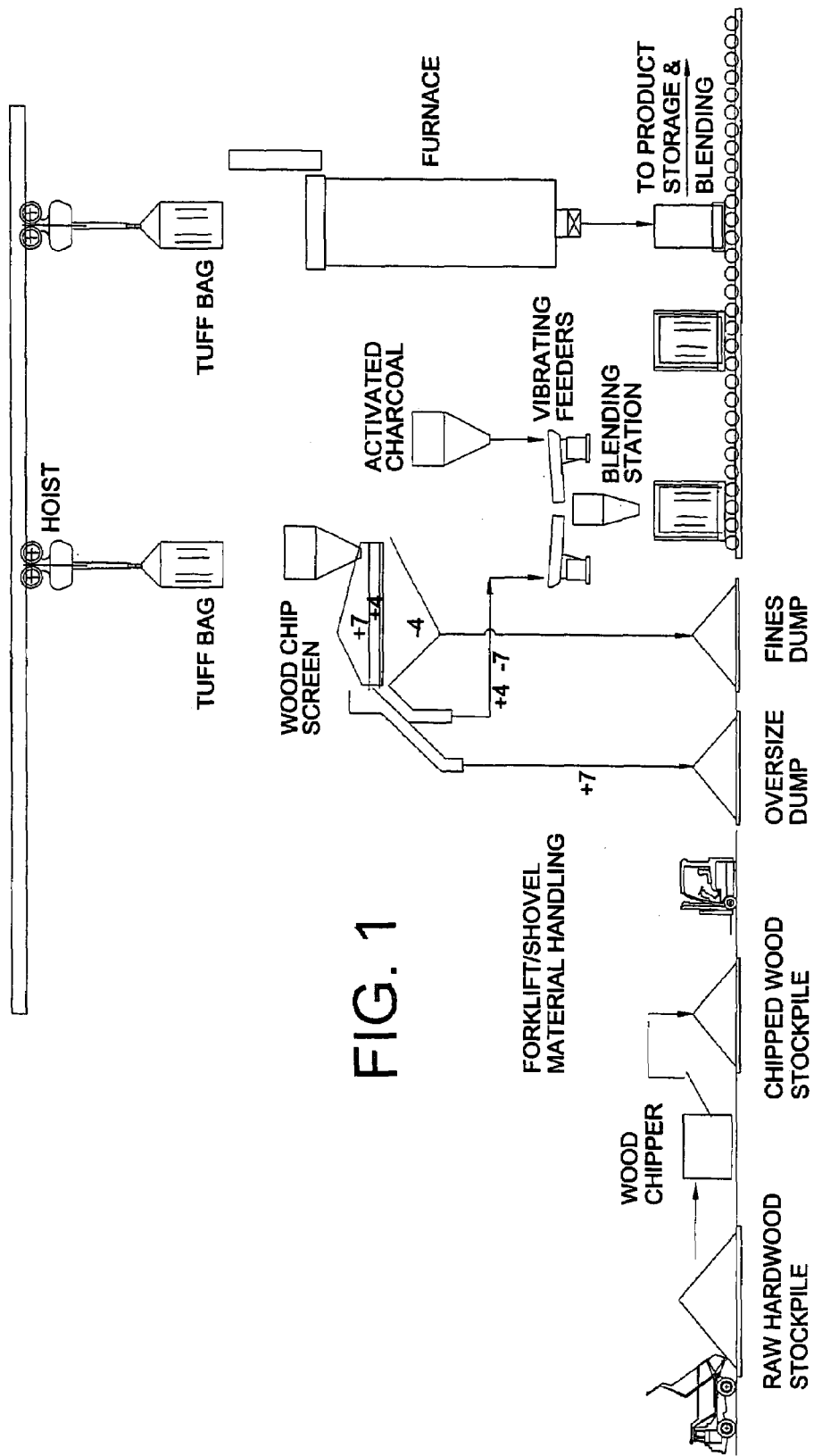
FIG. 1 is an illustration of an apparatus for charcoal activation according to a preferred embodiment of the present invention.
Figure 2:
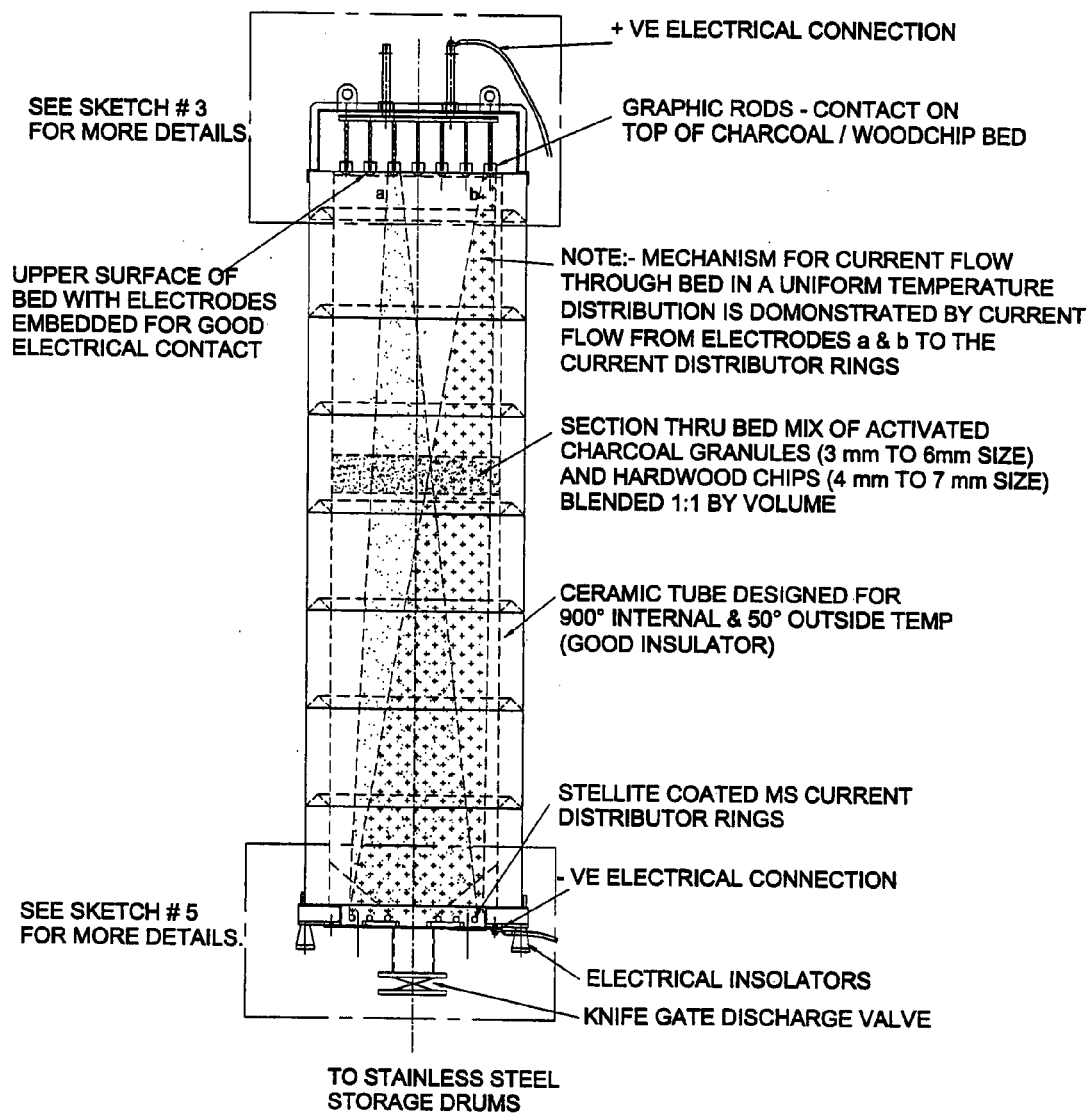
FIG. 2 is an illustration of an apparatus for charcoal activation according to a preferred embodiment of the present invention.
Figure 3:
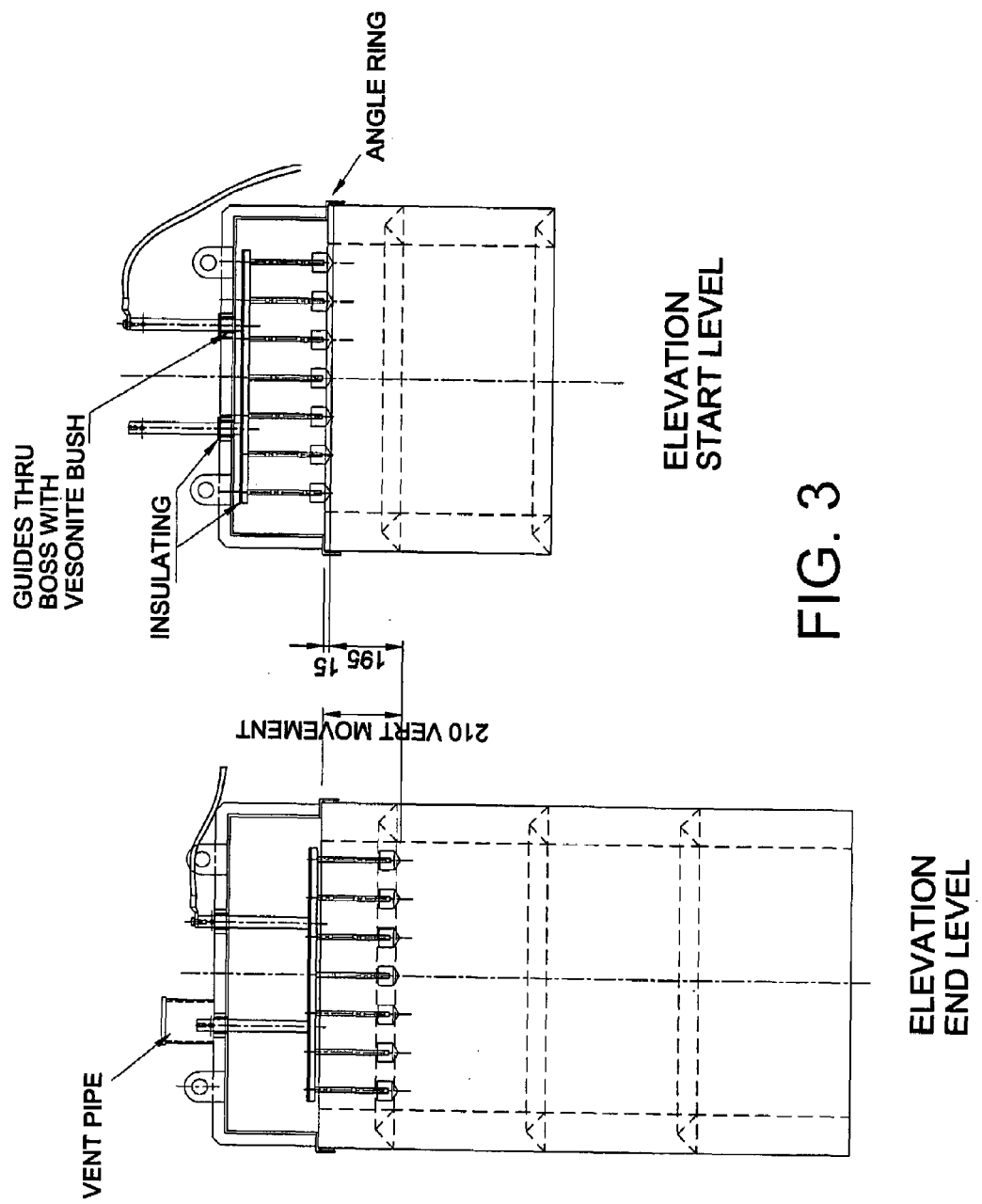
FIG. 3 is an illustration of an apparatus for charcoal activation according to a preferred embodiment of the present invention.
Figure 4:
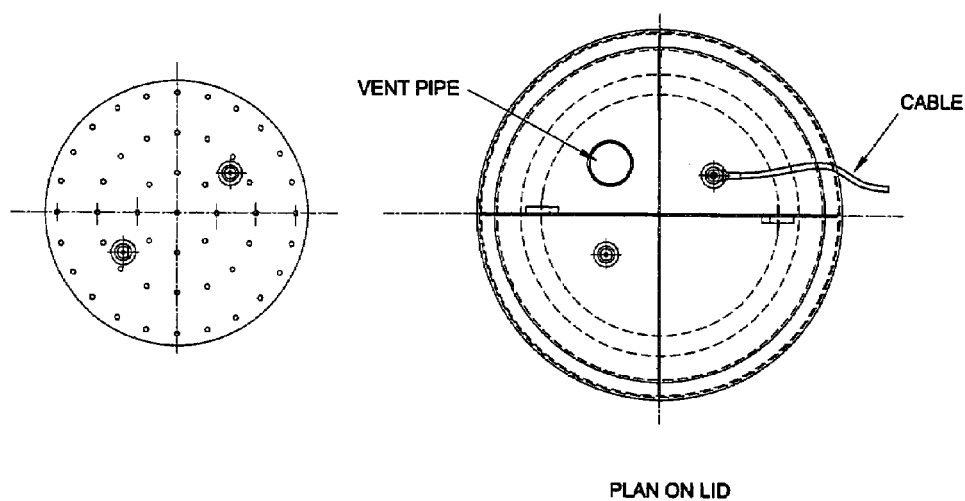
FIG. 4 is an illustration of an apparatus for charcoal activation according to a preferred embodiment of the present invention.
Figure 6:
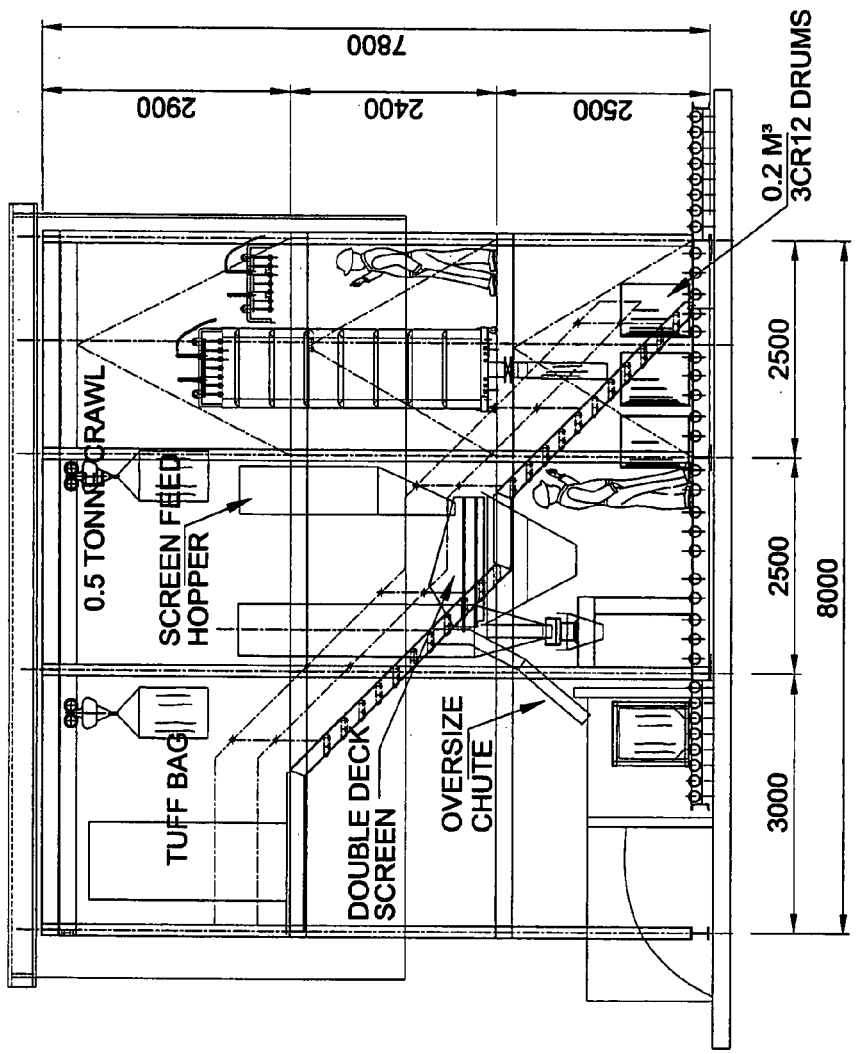
FIG. 6 is an illustration of an apparatus for charcoal activation according to a preferred embodiment of the present invention.
Figure 7:
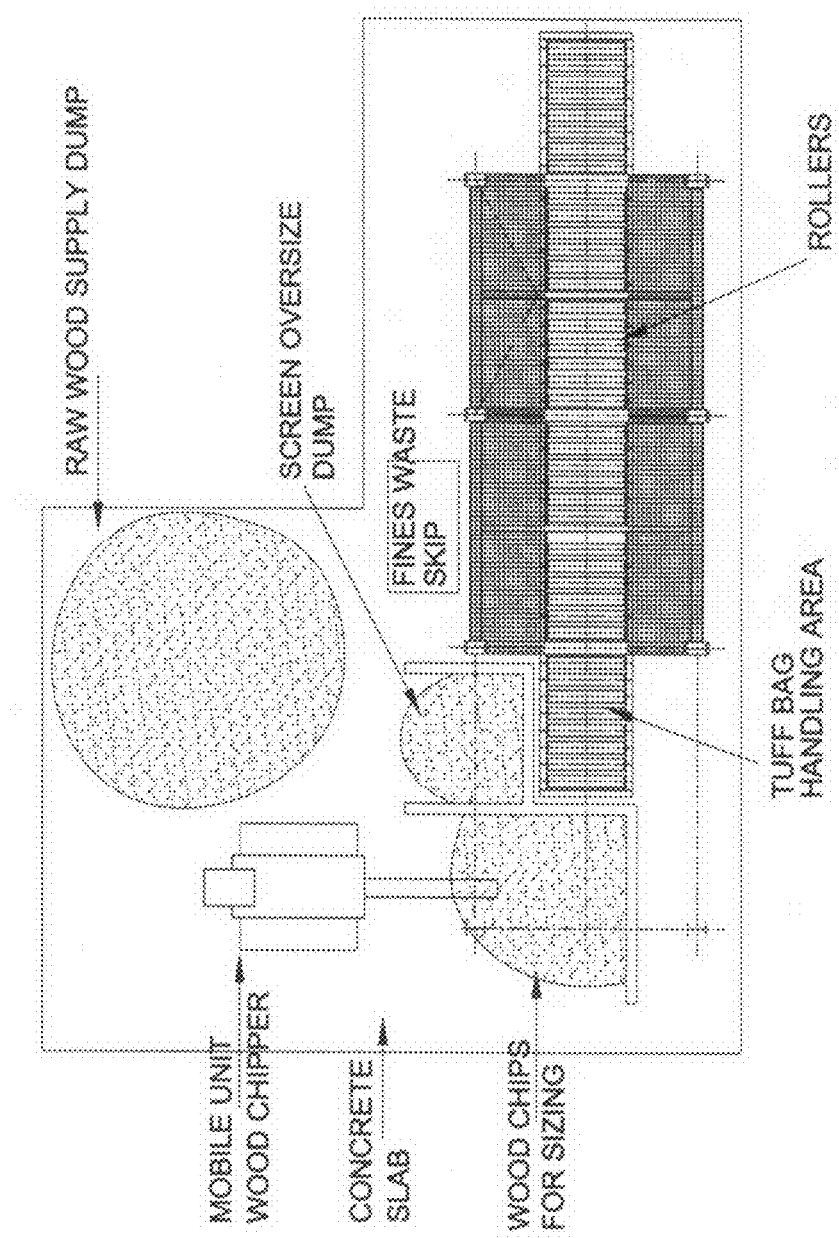
FIG. 7 is an illustration of an apparatus for charcoal activation according to a preferred embodiment of the present invention; and, FIG. 8 is an illustration of an apparatus for charcoal activation according to a preferred embodiment of the present invention.
Figure 8:
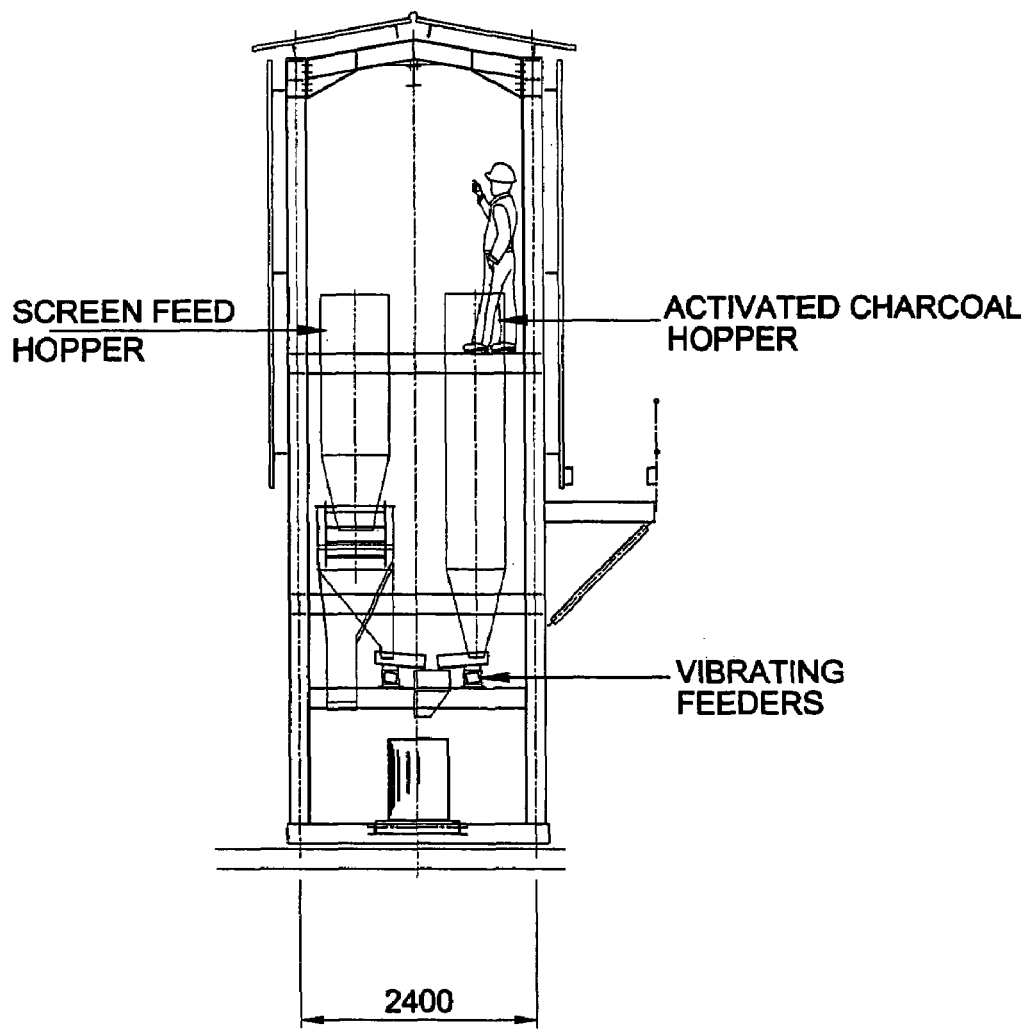

Because the activated charcoal granules in the bed are electrical semi-conductors, when this voltage is applied across the vertical extremities of the bed, a specific electrical current, dependent on the voltage applied and electrical resistance of the bed, will flow from the top to the bottom of the bed between the +ve and −ve terminals, as best illustrated in FIG. 2.

This current flow causes an electrical heating effect in the bed with the accompanying rise of temperature in the bed, which can be controlled by varying the voltage, as applied across the bed, in a uniform and controllable way.

The electrical heating effect is by resistive heating and is preferably derived by the following computation:

Applied volts×amps (flowing between the electrodes)/1000=KW energy generated within the bed The electrical resistance of the bed is dependant on the following factors:
a) The height and cross sectional area of the bed.
b) The electrical resistivity of the activated carbon granules (i.e., for the activated charcoal in question this resistivity value at ambient temperature will typically be approximately 30 ohm cm As such, based upon the values of (a) and (b), above, the electrical resistance of the bed is computed as follows:

resistivity (ohm cm)×vertical height of bed (cm)/Area of bed (square cm)=ohms

By controlling the imposed voltage across the terminal electrodes of the bed, a uniform bed temperature throughout the bed can be accurately controlled, which, in turn, results in the ability to produce a high quality activated charcoal.

An additional advantage of the process of the current invention may be found in its exothermic nature. As the voltage induced temperature rises within the bed, the hardwood chip material undergoes an exothermic reaction in its reduction to charcoal. This exothermic reaction serves to drive the bed temperature upwardly without introduction of additional voltage. Accordingly, as the process ensues, the net voltage required to maintain a carbonizing temperature may be downwardly regulated to save energy.

Accordingly, the advantages of this technology compared to the existing technologies are as follows:
a) Significant cost saving in energy to produce activated charcoal;
b) Significant time saving in the production cycle to produce activated charcoal;
c) Significant improvement in the yield to produce activated charcoal from hardwoods;
d) Significant decrease of environmental pollution in the production of activated charcoal;
e) Significant improvement in the user friendliness of operating the system to produce activated charcoal; and,
f) Significant decrease in the capital cost of the preferred furnace system to produce high quality activated charcoal.

The attached material and energy balances derived from tests, using the preferred pilot scale furnace, demonstrate the above claims of novelty and nonobviousness of this technology compared to technologies presently in use.

MATERIAL BALANCE (YIELD)
Conversion of dry hardwood to Activated Charcoal

| System Used | Dry Hardwood Start | Processing to Raw Charcoal (up to 500 deg. C.) | Processing to Activated Charcoal (up to 700 deg. C.) | Yield |
| --- | --- | --- | --- | --- |
| Conventional Charcoal producing Kiln (Beehive type or other) plus Rotary Activation Kiln (externally heated) | 1,000 lbs (logs) | 200 lbs (losses due to burn-off, pyrolysis, attrition and screening) | 140 lbs (losses due to water gas reaction, attrition and screening) | 14% |
| Furnace of Present | 1,000 lbs | 600 lbs | 550 lbs | 65% |

MATERIAL BALANCE (YIELD)
Conversion of dry hardwood to Activated Charcoal

| System Used | Dry Hardwood Start | Processing to Raw Charcoal (up to 500 deg. C.) | Processing to Activated Charcoal (up to 700 deg C.) | Yield |
|---|---|---|---|---|
| Invention (internal electrical resistive heating) | (pre-sized chips) | (losses due to pyrolysis) | (losses due to water gas reaction and attrition) | |

ENERGY BALANCE
Conversion of dry hardwood to Activated Charcoal

| System Used | Dry Hardwood Start | Processing to Raw Charcoal (up to 500 deg. C.) | Processing to Activated Charcoal (up to 700 deg C.) | Total Energy KCals/lb | Cost Comparisons $/lb |
|---|---|---|---|---|---|
| Conventional Charcoal producing Kiln (Beehive type or other) plus Rotary Activation Kiln (externally heated) | 1,000 lbs (logs) | 3600 KCals/lb 200 lbs (weight loss due to internal burn-off, pyrolysis, attrition and screening) | 3200 KCals/lb 140 lbs (weight losses due to water gas reaction, attrition and screening) | 6800 | 0.70 (Diageo) |
| Furnace of Present Invention (internal electrical resistive heating) | 1,000 lbs (pre-sized chips) | 1200 KCals/lb 600 lbs (weight loss due to pyrolysis) | 800 KCals/lb 550 lbs (weight losses due to water gas reaction and attrition) | 2000 | 0.12 (ACI) |

Ecological implications and advantages of the present invention include, but are not limited to, the following:
  a) Up to 3 times less hardwood to manufacture charcoal, compared to traditional charcoal production;
  b) The present method will produce no greater pollution than conventional known charcoal production processes;
  c) The present charcoal, made even more economically, on a larger scale, by recovering electrical energy from furnace off gases and blended with coal to feed power stations, will reduce pollution.

Having thus described exemplary embodiments of the present invention, it should be noted by those skilled in the art that the within disclosures are exemplary only, and that various other alternatives, adaptations, and modifications may be made within the scope of the present invention. Accordingly, the present invention is not limited to the specific embodiments illustrated herein, but is limited only by the following claims.

What is claimed is:

1. A process for charcoal manufacture and activation, comprising the steps of:
  a. obtaining raw material comprising hardwood chips;
  b. selectively sizing said raw material;
  c. blending said raw material on an approximately equal volumetric basis with selectively sized activated charcoal granules;
  d. introducing said blend into an electrical resistance furnace to form a bed of said blend;
  e. applying a voltage across said bed; and,
  f. controlling said voltage across said bed to produce a uniform bed temperature;
whereby a high quality uniform activated charcoal is produced thereby.

2. The method of claim 1, wherein said voltage is approximately five hundred volts direct current (500 VDC).

3. The method of claim 1, wherein said raw material is sized less than approximately seven millimeters, but greater than approximately four millimeters.

4. The method of claim 1, wherein said activated granules are sized less than approximately six millimeters, but greater than approximately three millimeters.

* * * * *